(12) United States Patent
Chen et al.

(10) Patent No.: US 7,497,611 B2
(45) Date of Patent: Mar. 3, 2009

(54) POLARIZED LIGHT SOURCE DEVICE AND BACK LIGHT MODULE FOR LIQUID CRYSTAL DISPLAY

(75) Inventors: Wei Chou Chen, Hsinchu (TW); Kei Hsiung Yang, Taoyuan (TW)

(73) Assignee: Hannstar Display Corp., Taipei (TW)

( * ) Notice: Subject to any disclaimer, the term of this patent is extended or adjusted under 35 U.S.C. 154(b) by 18 days.

(21) Appl. No.: 11/836,677

(22) Filed: Aug. 9, 2007

(65) Prior Publication Data

US 2008/0205084 A1 Aug. 28, 2008

Related U.S. Application Data

(62) Division of application No. 10/446,663, filed on May 29, 2003, now Pat. No. 7,264,390.

(30) Foreign Application Priority Data

| Oct. 23, 2002 | (TW) | ............................... 91125380 A |
| Dec. 16, 2002 | (TW) | ............................... 91136762 A |

(51) Int. Cl.
*F21V 7/04* (2006.01)
(52) U.S. Cl. .............................. 362/622; 362/19; 349/65
(58) Field of Classification Search ................... 362/19, 362/31, 293, 297, 298, 622, 629; 349/9, 349/65

See application file for complete search history.

(56) References Cited

U.S. PATENT DOCUMENTS

2002/0003593 A1 * 1/2002 Arakawa et al. .............. 349/65

* cited by examiner

*Primary Examiner*—John A Ward

(57) ABSTRACT

A polarized light source device comprises a light source, a reflector, a transparent substrate, an antireflection layer, and a plurality of metal grid wires. The reflector surrounds the light source for reflecting the light, and has an opening for emitting the light. The transparent substrate is disposed at the opening. The antireflection layer is disposed on the transparent substrate. The metal grid wires are disposed on the antireflection layer for transmitting the light with a predetermined polarization therethrough.

15 Claims, 12 Drawing Sheets

POLARIZED LIGHT SOURCE DEVICE AND BACK LIGHT MODULE FOR LIQUID CRYSTAL DISPLAY

CROSS REFERENCE TO RELATED APPLICATION

The present application is a divisional continuation of U.S. patent application Ser. No. 10/446,663, filed May 29, 2003, now U.S. Pat. No. 7,264,390 which claims priority from Taiwan Patent Application Serial Number 091125380, filed Oct. 23, 2002 and Taiwan Patent Application Serial Number 091136762, filed Dec. 16, 2002, the disclosures of which is hereby incorporated by reference herein in their entirety.

The present application is also related to U.S. patent application Ser. No. 11/461,650, filed Aug. 2, 2006.

BACKGROUND OF THE INVENTION

1. Field of the Invention

The present invention generally relates to a polarized light source device, and more particularly, to a back light module for a liquid crystal display (LCD) which provides polarized light with high transmittance.

2. Description of the Related Art

Referring to FIG. 1, it depicts the structure of a conventional liquid crystal display. Generally, the liquid crystal display device includes a liquid crystal display panel 10 which has two substrates and a liquid crystal material sealed therebetween, a back light unit 20 disposed under the liquid crystal display panel 10, and cases 11 and 12.

The back light unit 20 is utilized to distribute the light from a light source uniformly over the surface of the liquid crystal display panel 10. There are several kinds of back light units 20 such as a direct back light type (or direct type) and an edge light type.

Referring to FIG. 2, it is a cross-sectional view along line 2-2 of FIG. 1 and depicts a back light module 21 of the direct type. The direct type back light module 21 includes a housing 70 which has a reflective sheet 60 disposed on the bottom surface of the housing 70, a lamp 50, such as a fluorescence cathode tube, disposed at the bottom portion of the housing 70, a diffusing sheet 40 disposed on the upper surface of the housing 70 and a prism sheet 30 disposed on the diffusing sheet 40.

Referring to FIG. 3, it is a cross-sectional view along line 2-2 of FIG. 1 and depicts a back light module 22 of the edge light type. The edge light type back light module 22 includes a light guide 80, a lamp 50 which is attached to at least one edge of the light guide 80, and a U-shaped reflector 61 which surrounds the lamp 50. An open portion of the reflector 61 is disposed at the edge of the light guide 80, a reflecting sheet 60 is disposed at the bottom of the light guide 80, a diffusing sheet 40 is disposed on the light guide 80 and a prism sheet 30 is disposed on the diffusing sheet 40. Because the lamp 50 is disposed at the edge of the light guide 80, the thickness of the LCD can be relatively decreased.

The light guide 80 includes a printed dot pattern or a V-shaped notched pattern 82 on at least one surface for scattering the light in the light guide 80 and illuminating the liquid crystal display panel 10. The light guide 80 and the dot pattern or V-shaped notched pattern 82 thereon are typically made of PMMA by the process of press or ejection molding. The diffusing sheet 40 is disposed on the light guide 80 and typically made of half-transparent PET or polycarbonate for further evenly diffusing the light emitted from the light guide 80. The prism sheet 30 is disposed on the diffusing sheet 40 for gathering the diffused light from the diffusing sheet 40 in the direction perpendicular thereto.

Since the liquid crystal display panel 10 has a polarizing sheet for transmitting the light with one polarizing direction and absorbing the light with the other polarizing direction, about 50% of the energy of the light is lost when the light passes the polarizing sheet. Therefore, a polarization recycle film 35 is typically disposed on the prism sheet 30 for reflecting the light with the other polarizing direction, and the reflected light then is reflected by the optical element thereunder and recycled after the polarizing direction thereof is changed, thereby increasing the brightness of the liquid crystal display. However, the above-mentioned polarization recycle film is available typically from 3M™ Company of St. Paul Minn. under the trade name Dual Brightness Enhancement Film (DBEF), which causes the liquid crystal display up to 160-170% brighter, but is significantly expansive. Further, the cost of the liquid crystal display will increase more and more as the dimension of the liquid crystal display increases in recent years.

Generally, the back light module of the liquid crystal display shall be constructed to meet the requirements of increasing power efficiency and the screen brightness, providing uniform brightness, lowering power consumption and cost, as well as decreasing the dimension. Prior art attempts have been made to meet the requirements and, for example, can be seen in U.S. Pat. No. 6,164,790 issued to Lee on Dec. 26, 2000, U.S. Pat. No. 5,477,422 issued to Hooker et al. on Dec. 19, 1995, and U.S. Pat. No. 5,485,354 issued to Ciupke et al. on Jan. 16, 1996. These patents are all incorporated herein by reference.

Japan Patent Application No. 11 (1999)-233919, which is incorporated herein by reference, discloses a fluorescent lamp with reflective film for a back light module of a liquid crystal display so as to avoid the inter-reaction between the adjacent lamps and further avoid the decrement of illumination due to the inter-reaction.

Furthermore, U.S. Pat. No. 6,122,103 issued to Perkins on Sep. 19, 2000 entitled "Broadband Wire Grid Polarizer For The Visible Spectrum", which is incorporated herein by reference, discloses a polarizer with metal grid wires, which provides high transmittance and reflectance for the entire visible spectrum.

U.S. patent application Ser. No. 10/227,841 entitled "Panel Light Source Device And Back Light Module For Liquid Crystal Display Device", filed on Aug. 27, 2002 and commonly assigned to the assignee of the present application, discloses a back light module with metal grid wires and is incorporated herein by reference.

The conventional metal grid wire polarizer 90 substantially comprises a transparent substrate 92 made of glass and metal grid wires 94 disposed thereon, as shown in FIG. 4. Now referring to FIG. 5, it depicts the graphic plot of transmittance Tp, Ts and the reflectance Rp, Rs of the P-polarization (polarizing direction perpendicular to the metal grid wires 94) and S-polarization (polarizing direction parallel to the metal grid wires 94) of the metal grid wires 94 versus the ratio $\Omega$ of the width W to the pitch P of the metal grid wires 94, where the thickness T of the metal grid wires 94 is about 0.1 μm and the wavelength of the incident light is about 0.545 μm (green light). Although the metal grid wires are easy to manufacture in the range of the ratio $\Omega$ from 0.5 to 0.6, the transmittance Tp of the P-polarization (polarizing direction perpendicular to the metal grid wires) of the metal grid wires 94 is comparatively low, as shown in the drawing.

Accordingly, there exists a need for a light source and/or a back light module of a liquid crystal display capable of meeting the above-mentioned requirements.

SUMMARY OF THE INVENTION

It is an object of the present invention to provide a polarized light source for providing the liquid crystal display with the polarized light so as to increase the energy efficiency of the liquid crystal display.

It is another object of the present invention to provide a back light module for providing the liquid crystal display with the polarized light so as to increase the energy efficiency of the liquid crystal display.

In order to achieve the above objects, the present invention provides a polarized light source device comprising a light source, a reflector, a transparent substrate, an antireflection layer, and a plurality of metal grid wires. The reflector surrounds the light source for reflecting the light, and has an opening for emitting the light. The transparent substrate is disposed at the opening. The antireflection layer is disposed on the transparent substrate. The metal grid wires are disposed on the antireflection layer for transmitting the light with a predetermined polarization therethrough.

The present invention further provides a polarized light source comprising an illuminant, a reflective film, and a plurality of metal grid wires. The reflective film surrounds the illuminant and has an opening for emitting the light. The metal grid wires are disposed at the opening for transmitting the light with a predetermined polarization therethrough.

The polarized light source according to the present invention can be attached to a liquid crystal display for illuminating a liquid crystal display panel of the liquid crystal display.

Accordingly, the back light module or the polarized light source according to the present invention includes a polarizing element and thus provides the polarized light without lowering the energy efficiency. Also, the polarized light may be transmitted through the polarizing film of the liquid crystal display to minimize the light absorbed by the polarizing film. Therefore, the back light module or the panel light source according to the present invention dispenses with the expensive optical film and still meets the requirements of increasing the entire power efficiency, increasing the brightness, and lowering the cost of the liquid crystal display.

BRIEF DESCRIPTION OF THE DRAWINGS

Other objects, advantages, and novel features of the invention will become more apparent from the following detailed description when taken in conjunction with the accompanying drawing.

DESCRIPTION OF THE EMBODIMENT

Figure 1:
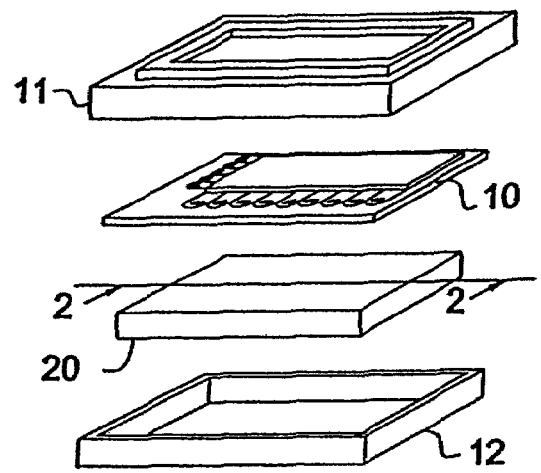
FIG. 1 is a perspective exploded schematic view of a liquid crystal display according to the prior art.
Figure 2:
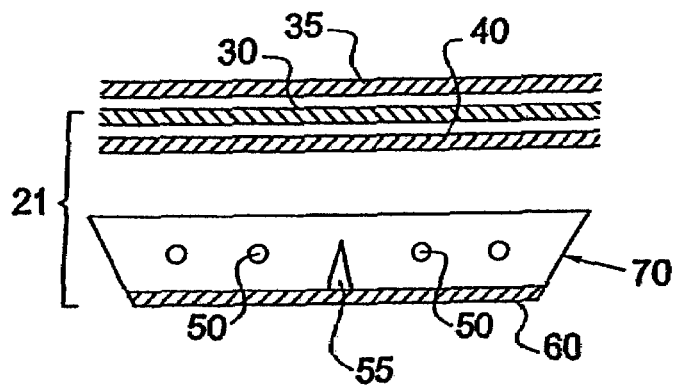
FIG. 2 is a cross sectional schematic view along line 2-2 of FIG. 1 of a direct type back light module according to the prior art.
Figure 3:
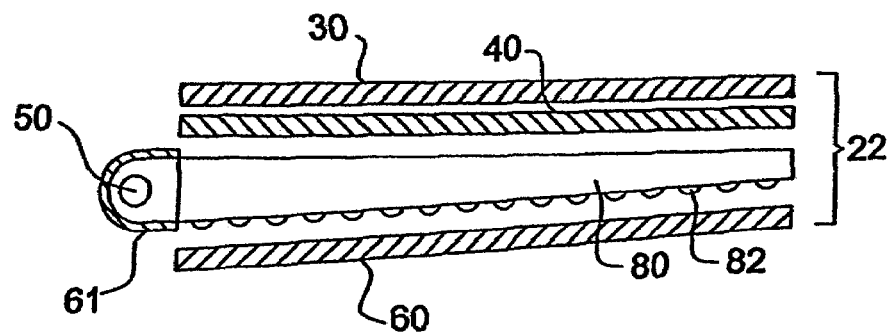
FIG. 3 is a cross sectional schematic view along line 2-2 of FIG. 1 of an edge light type back light module according to the prior art.
Figure 4:
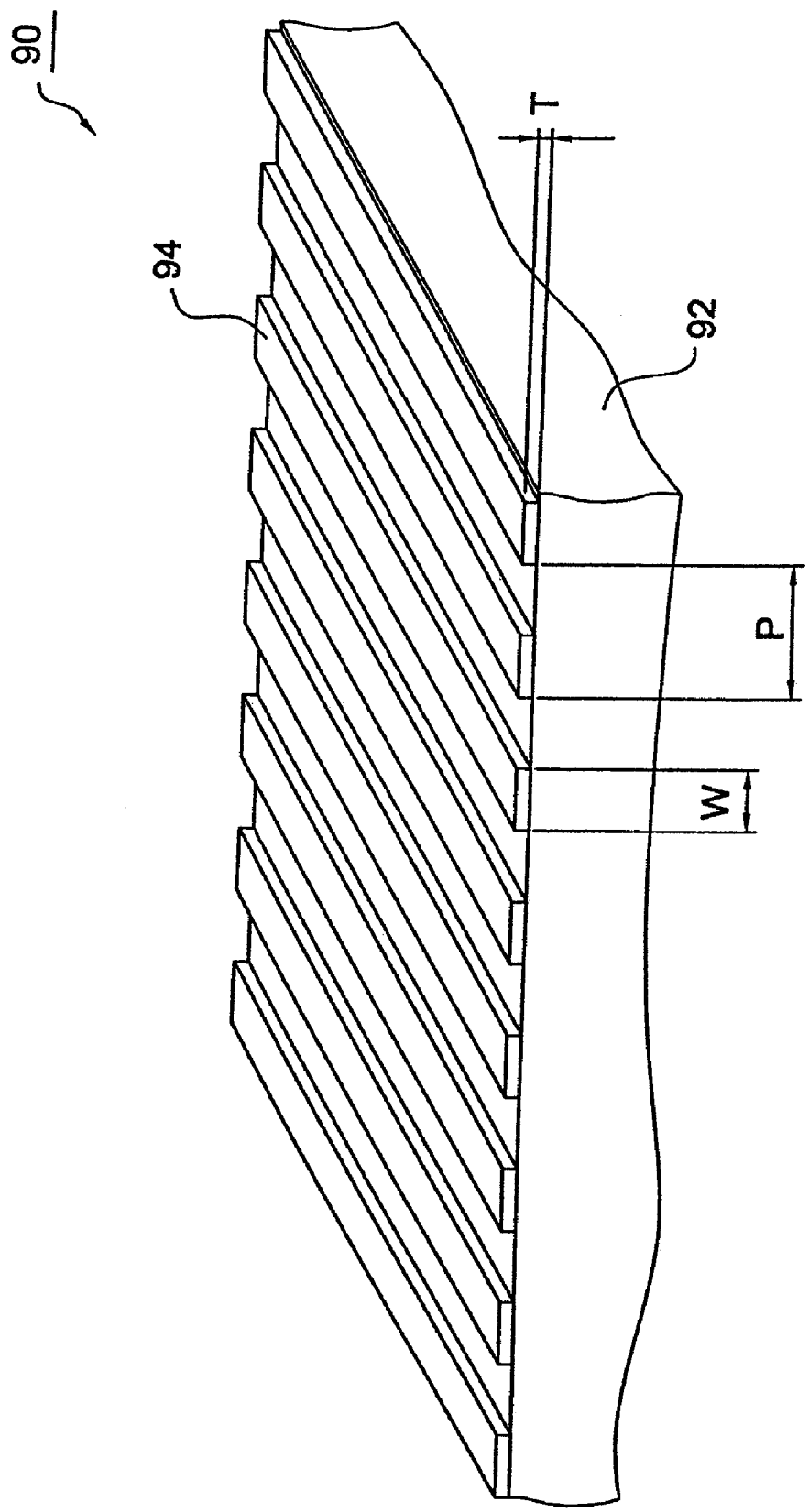
FIG. 4 is a cross sectional schematic view of a conventional metal grid wire polarizer.
Figure 5:
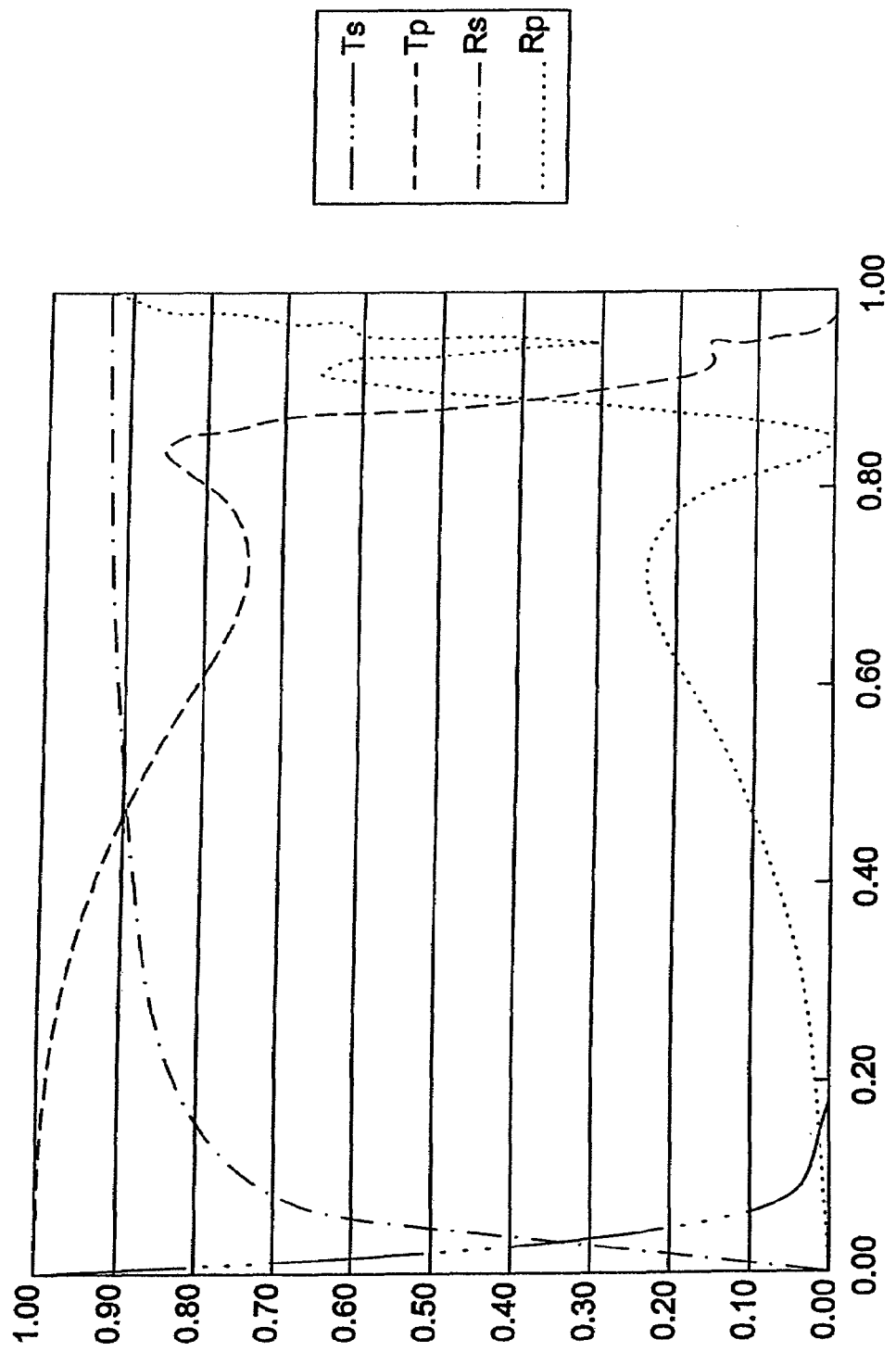
FIG. 5 is a graphical plot showing the relationship between the ratio Ω of the width to the pitch of the metal grid wires shown in FIG. 4, and the transmittance and the reflectance thereof.
Figure 6:
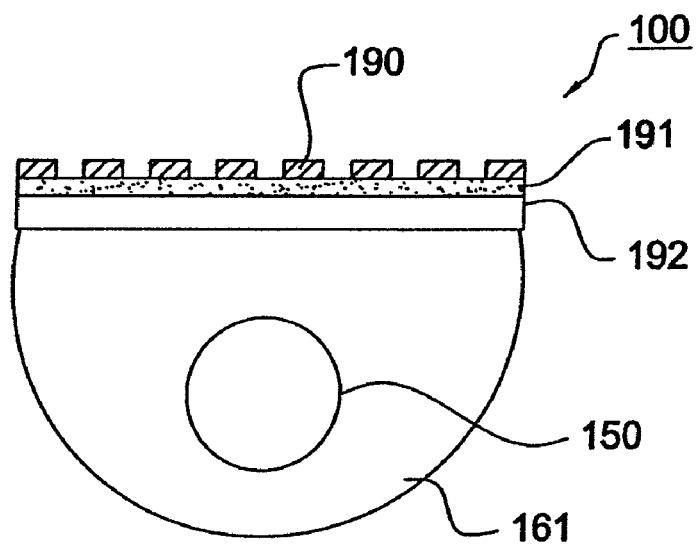
FIG. 6 is a cross sectional schematic view of a polarized light source device according to an embodiment of the present invention.

Referring to FIG. 6, it depicts a polarized light source device 100 according to an embodiment of the present invention. The polarized light source device 100 comprises a light source, such as a lamp 150, a reflector 161 surrounding the lamp 150, and a polarizer 192. The lamp 150 can be a cold cathode fluorescent lamp (CCFL).

Figure 8:
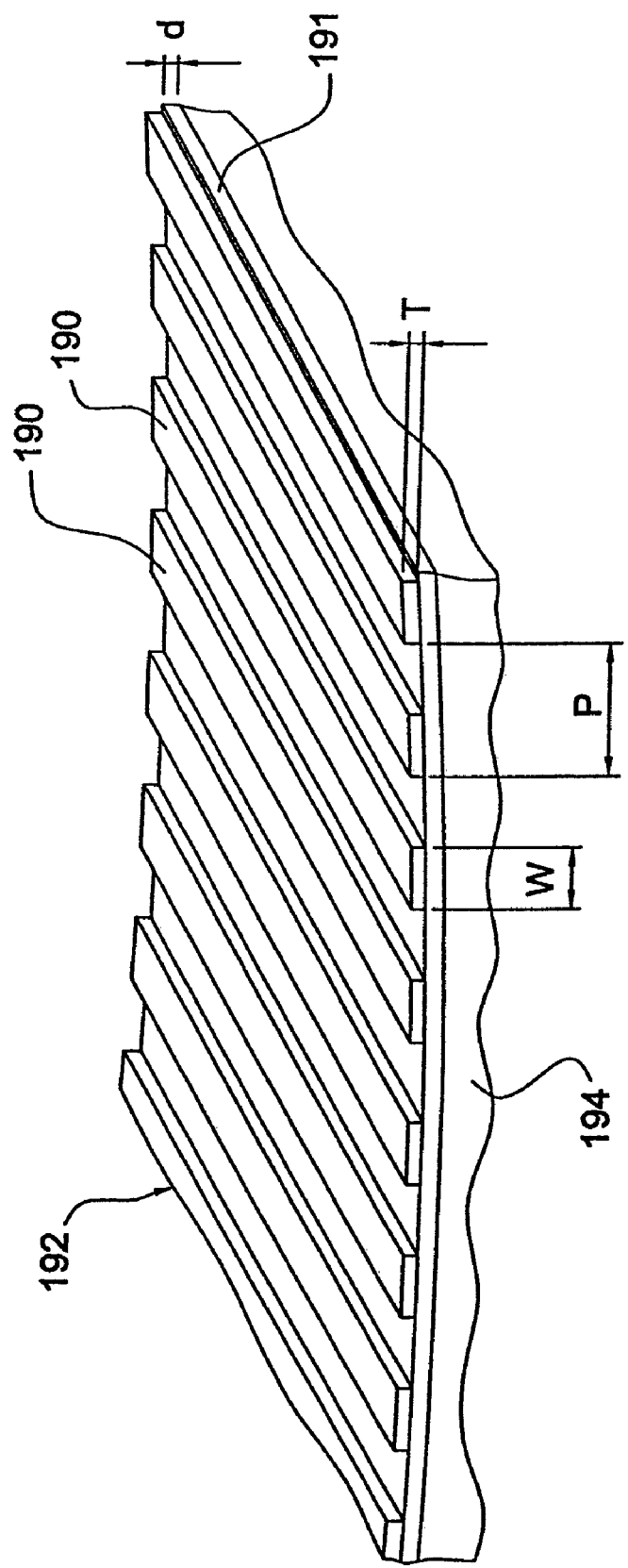
FIG. 8 is a partial enlarged cross sectional schematic view of a polarizer of the polarized light source device shown in FIG. 6.

Now referring to FIG. 8, it depicts the polarizer 192 of the polarized light source device 100. The polarizer 192 comprises a transparent substrate 194, an antireflection layer 191 disposed on the transparent substrate 194, and metal grid wires 190 disposed on the antireflection layer 191. Light emitted from the lamp 150 is transmitted into the transparent substrate 194, through the antireflection layer 191, and out of the metal grid wires 190. The transparent substrate 194 is made of transparent material, such as glass and acrylic resin (PMMA), the refractive index of which is $n_s$. The antireflection layer 191 is made of transparent dielectric material, such as nitrogen silicide (Si-Nx), the refractive index of which is $n_m$. The antireflection layer 191 shown in the drawing is a single film coated on the transparent substrate 194, but it will be apparent to those skilled in the art that the antireflection layer 191 can be a multi-layer film coated on the transparent substrate 194. The refractive index of the antireflection layer 191 is in the range between the refractive index $n_s$ of the transparent substrate 194 and the equivalent refractive index $n_a$ of the metal grid wires 190, i.e. $n_s > n_m > n_a$. Preferably, the refractive index $n_m$ of the antireflection layer 191 is derived from the following equation:

$$\overline{n_m \approx \sqrt{(n_a \times n_s)}}$$

The thickness d of the antireflection layer 191 is derived from the following equation:

$d \approx 1/4 \times \lambda / n_m$ where λ is the wavelength of the incident light.

In fact, the transparent substrate 194 is made of glass or PMMA, and thus the antireflection layer 191 should be made of the material of which the refractive index is above about 1.5.

The metal grid wires 190 are parallel to the lamp 150, and spaced out and formed on the antireflection layer 191 such that the light with the polarizing direction perpendicular to the metal grid wires 190 (P-polarization), i.e. perpendicular to the longitudinal direction of the lamp 150, is transmitted and the light with the polarizing direction parallel to the metal grid wires 190 (S-polarization) is reflected.

According to the present invention, the metal grid wires 190 are made of aluminum (Al), silver (Ag), copper (Cu) or alloy, and preferably are made of aluminum. Preferably, the pitch P of the metal grid wires 190 is below about 300 nm, the thickness T of the metal grid wires 190 is in the range from about 30 nm to about 200 nm, and the ratio of the width W to the pitch P of the metal grid wires 190 is in the range from about 0.1 to about 0.8.

Figure 9:
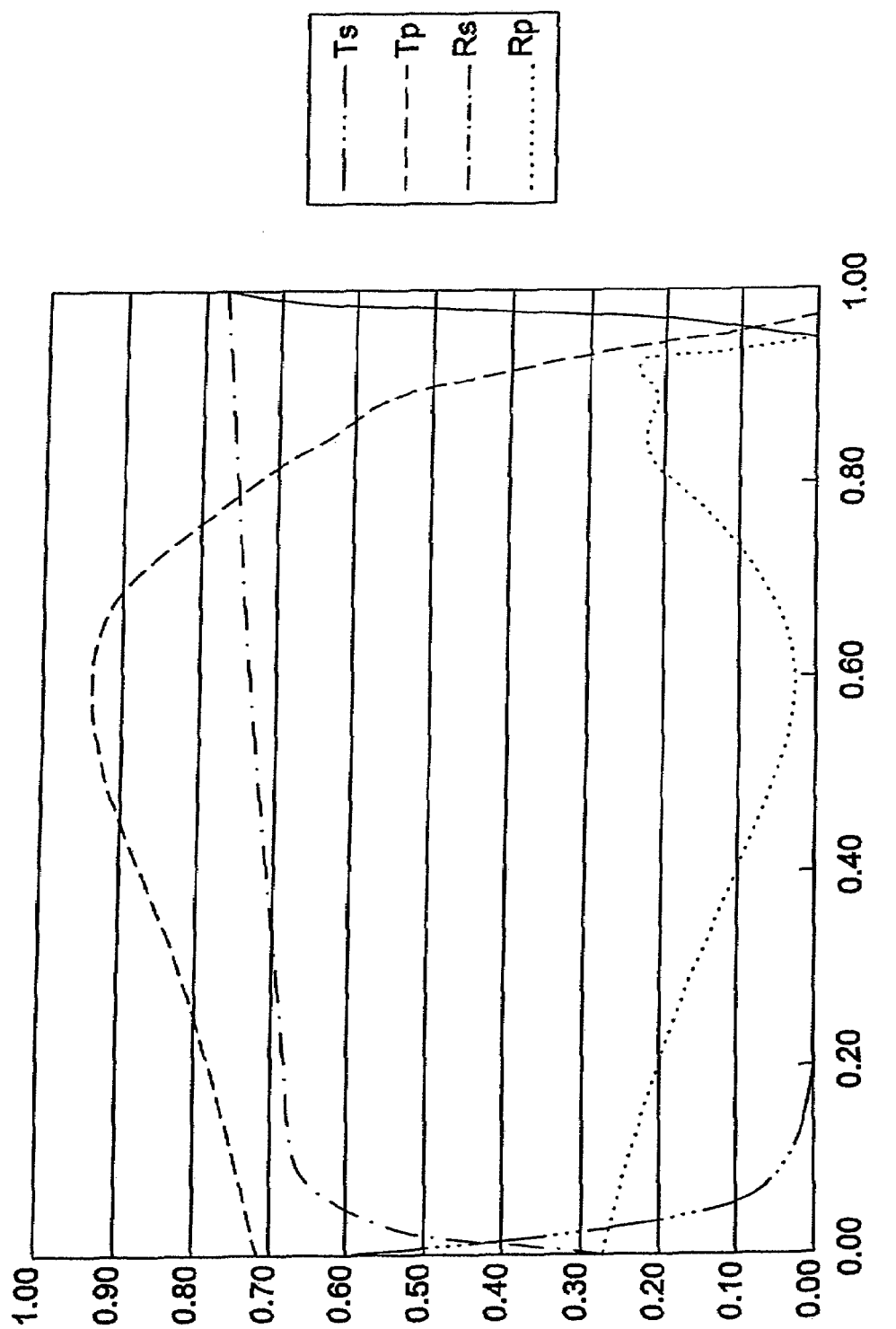
FIG. 9 is a graphical plot showing the relationship between the ratio Ω of the width to the pitch of the metal grid wires shown in FIG. 6, and the transmittance and the reflectance thereof.

Now referring to FIG. 9, it depicts the graphic plot of transmittance Tp, Ts and the reflectance Rp, Rs of the P-polarization (polarizing direction perpendicular to the metal grid wires 190) and S-polarization (polarizing direction parallel to the metal grid wires 190) of the polarizer 192 versus the ratio Ω of the width W to the pitch P of the metal grid wires 190. The transparent substrate 194 is made of glass, the thickness T of the metal grid wires 190 is about 0.1 μm, the wavelength of the incident light is about 0.545 μm (green light), and the antireflection layer 191 is made of nitrogen silicide (Si-Nx) and the thickness d of the antireflection layer 191 is 70 nm. As shown in the drawings, the transmittance Tp of the P-polarization (polarizing direction perpendicular to the metal grid wires 194) of the metal grid wires 190 is raised because of the existence of the antireflection layer 191 when the ratio Ω is in the range from 0.5 to 0.6.

Figure 7:
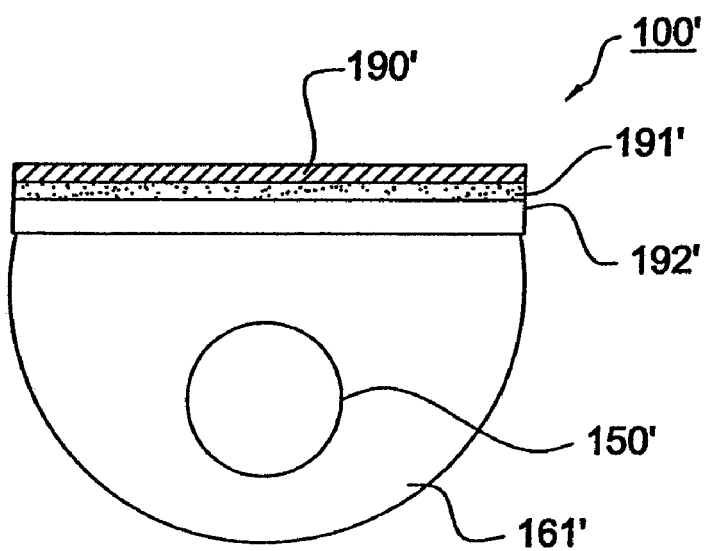
FIG. 7 is a cross sectional schematic view of a polarized light source device according to another embodiment of the present invention.

Now referring to FIG. 7, it depicts a polarized light source device 100' according to another embodiment of the present invention. The polarized light source device 100' is similar to the polarized light source device 100 and comprises a lamp 150', a reflector 161' surrounding the lamp 150', and a polarizer 192'. The polarizer 192' has metal grid wires 190'. The metal grid wires 190' are perpendicular to the lamp 150', and spaced out and formed on the antireflection layer 191' such that the light with the polarizing direction perpendicular to the metal grid wires 190' (P-polarization), i.e. parallel to the longitudinal direction of the lamp 150, is transmitted and the light with the polarizing direction parallel to the metal grid wires 190' (S-polarization) is reflected.

Figure 10:
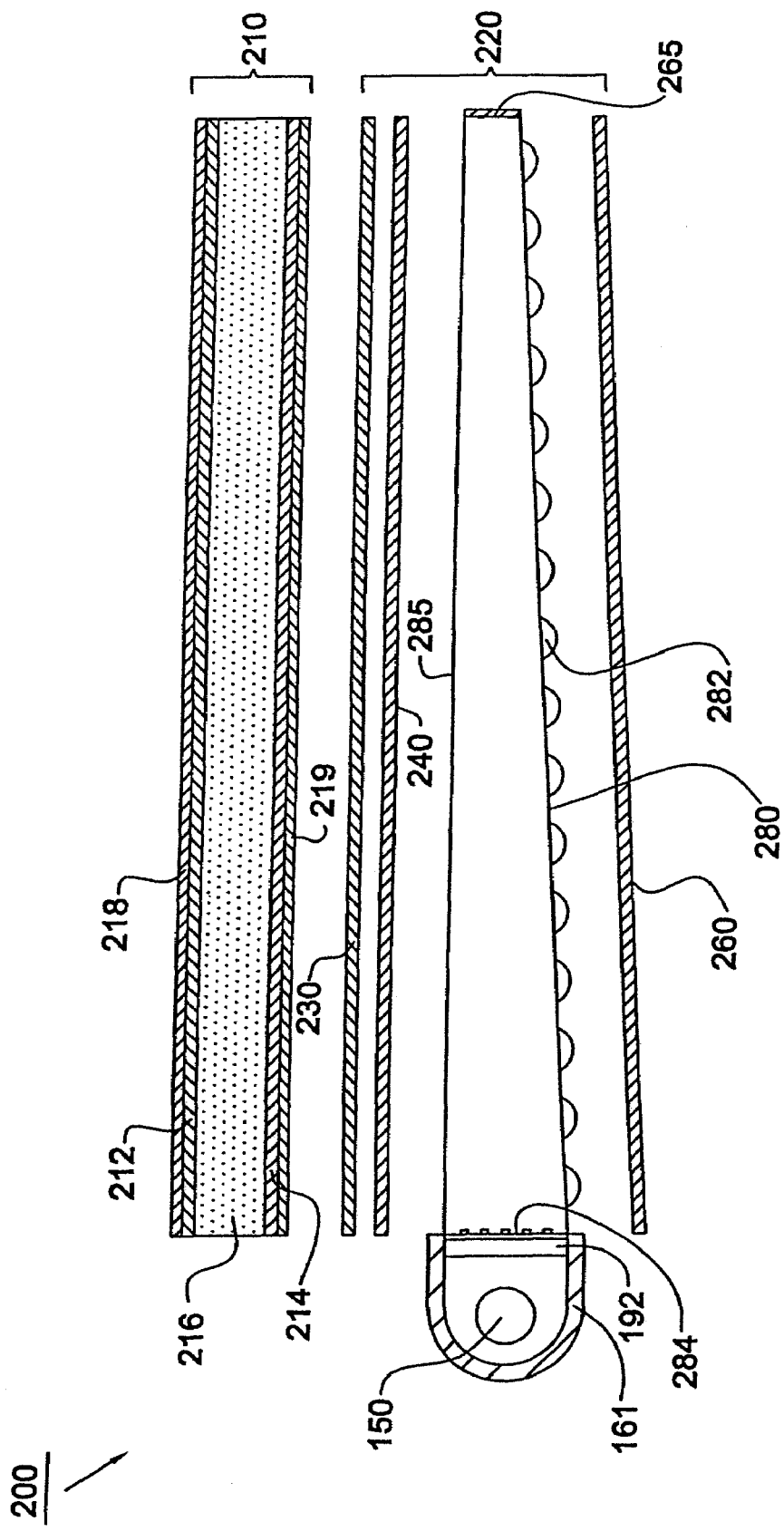
FIG. 10 is a cross sectional schematic view of a liquid crystal display using the polarized light source device according to the present invention.

Referring to FIG. 10, it depicts a liquid crystal display 200 using the polarized light source device 100 according to the present invention. The liquid crystal display 200 comprises a liquid crystal display panel 210 and a back light module 220. The liquid crystal display panel 210 comprises two transparent substrates 212, 214 and liquid crystal material 216 disposed therebetween. The outer surfaces of transparent substrates 212, 214 of the liquid crystal display panel 210 are covered with polarizing sheets 218, 219, and the inner surfaces thereof are provided with switching elements for changing the alignments of the molecular of the liquid crystal material 216 and thus generating images.

The back light module 220 is of an edge light type and is served as a panel light device for evenly illuminating the liquid crystal display panel 210. The back light module 220 comprises the polarized light source device 100 according to the present invention, a wedge light guide 280 and a plurality of layers of optical films, such as diffusing sheet 240 and a prism sheet 230. The diffusing sheet 240 is used for further evenly diffusing the light. The prism sheet 230 is commercially available from 3M™ Company of St. Paul Minn. under the trade name Brightness Enhancement Film II (BEF II) for gathering the light in the direction perpendicular thereto.

The light emitted from the polarized light source device 100 is transmitted into the light guide 280 via an incoming surface 284 of the light guide 280. The light guide 280 is provided with scattering elements 182, such as a printed dot pattern or a V-shaped notched pattern on the bottom surface of the light guide 280, for scattering the light in the light guides 180 and transmitting the light out of the upper surface or the outgoing surface 285 of the light guide 280 so as to serve as a uniform panel light source. The light guide 280 is typically made of PMMA by the process of press or ejection molding. The light guide 280 further comprises reflectors 260, 265 disposed in the bottom surface and the distal end of the light guide 280 for reflecting the light back to the light guide 280.

Obviously, it will be apparent to those skilled in the art that the polarizing direction of the polarizing sheet 219 on the liquid crystal display panel 210 is corresponding to that of the polarized light source device 100 such that the brightness of the liquid crystal display 200 is increased. Generally speaking, because of the arrangement of the liquid crystal display, the back light module 220 according to the present invention is particularly adapted to be used with a thin film transistor (TFT) liquid crystal display panel of In-Plane-Switching, Vertical Alignment, and Multi-Domain Vertical Alignment.

Figure 11:
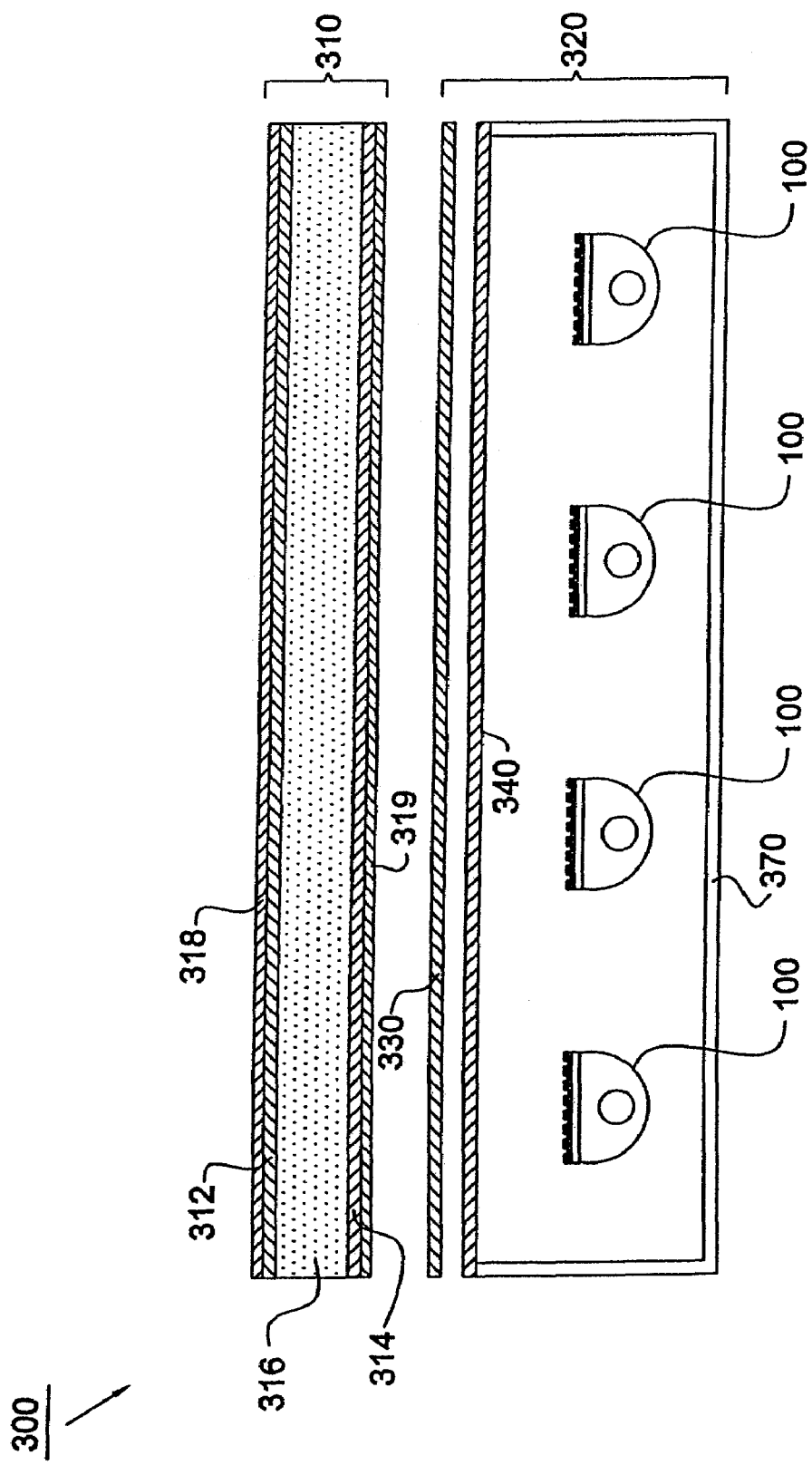
FIG. 11 is a cross sectional schematic view of another liquid crystal display using the polarized light source device according to the present invention.

Referring to FIG. 11, it depicts a liquid crystal display 300 using the polarized light source device 100 according to the present invention. The liquid crystal display 300 is generally similar to the liquid crystal display 200, wherein the similar elements are designated with the similar reference numerals. The liquid crystal display 300 comprises a liquid crystal display panel 110 and a back light module 320. The back light module 320 is of the direct back light type and is provided with a plurality of polarized light source device 100 disposed in a housing 370.

Accordingly, the back light module or the polarized light source according to the present invention provides the polarized light. The polarized light may be transmitted through the polarizing film of the liquid crystal display to minimize the light absorbed by the polarizing film. Therefore, the back light module or the panel light source according to the present invention dispenses with the expensive optical film and still meets the requirements of increasing the entire power efficiency, increasing the brightness, and lowering the cost of the liquid crystal display.

Figure 12:
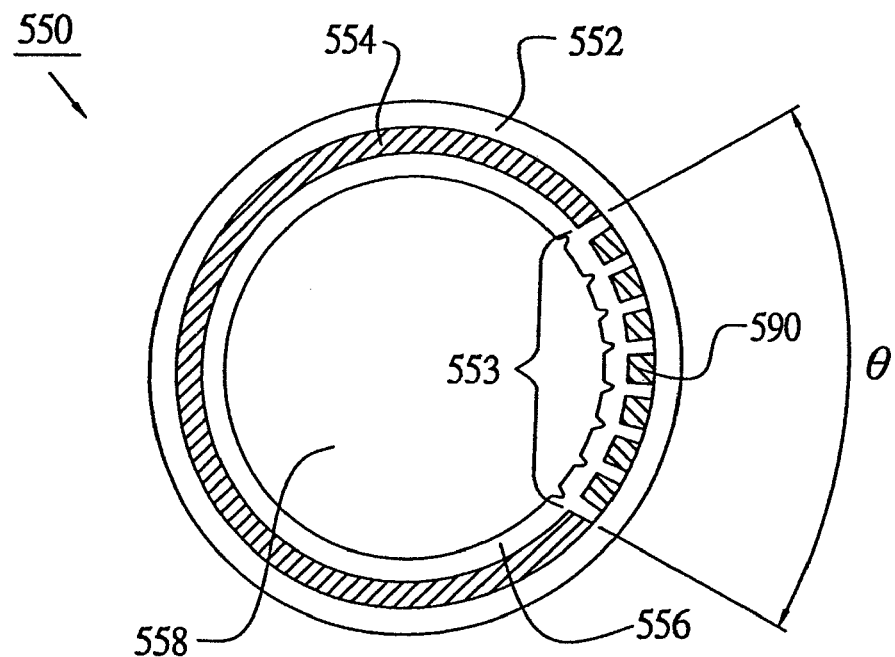
FIG. 12 is a cross sectional schematic view of a lamp according to an embodiment of the present invention.

Now referring to FIG. 12, it depicts a polarized light source or lamp 550 according to an embodiment of the present invention. The lamp 550 is applied to a liquid crystal display, typically is a cold cathode fluorescent lamp (CCFL), and has an elongated tube structure. The lamp 550 has a transparent substrate, such as a glass tube 552, a reflective film 554 coated on the inside surface of the glass tube 552, mercury vapor 558 filling the glass tube 552, and fluorescent material 556 disposed between the mercury vapor 558 and the glass tube 552. While voltage is applied to the both ends of the lamp 550, the mercury vapor 558 can be excited such that the fluorescent material 556 emits visible light. The light emitted from the fluorescent material 556 is reflected by the reflective film 554, and emits from an opening 553 of the reflective film 554. As shown in the drawing, the radial angle θ of the opening 553 is below 90 degree, and preferable in the range from about 30 degree to about 90 degree.

The lamp 550 further comprises a plurality of metal grid wires 590, which are disposed at the opening 553 of the reflective film 554 and are parallel to the longitudinal direction of the lamp 550. Further referring to FIG. 14, the metal grid wires 590 are spaced out and formed on the inside surface of the glass tube 552 such that the light with the polarizing direction perpendicular to the metal grid wires 590 is transmitted and the light with the polarizing direction parallel to the metal grid wires 590 is reflected.

It will be apparent to those skilled in the art that the polarized light source device is not limited to the cold cathode fluorescent lamp (CCFL). Other light source device, such as an incandescent lamp such as a halogen lamp and a discharge lamp such as a xenon lamp and a neon lamp, can be provided with metal grid wires and a reflective film so as to serve as a polarized light source device. The polarized light source device according to the present invention has an illuminant, such as a filament in an incandescent and xenon in a xenon lamp, a reflective film having an opening for projecting light, and a metal grid wire polarizer disposed at the opening for generating polarized light.

Figure 13:
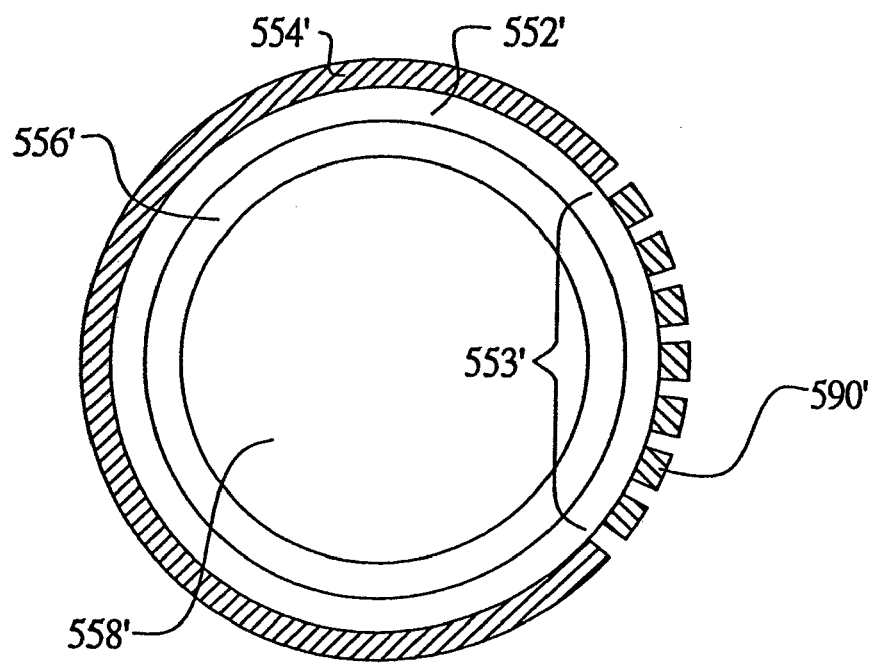
FIG. 13 is a cross sectional schematic view of a lamp according to another embodiment of the present invention.

Now referring to FIG. 13, it depicts a polarized light source or lamp 550' according to further another embodiment of the present invention. The lamp 550' comprises a reflective film 554' coated on the outside surface of the glass tube 552' and having an opening 553'. A plurality of metal grid wires 590' are disposed on the outside surface of the glass tube 552' at the opening 553'. The function of the metal grid wires 590', which is similar to that of metal grid wires 590, is used for transmitting the light with the polarizing direction perpendicular to the metal grid wires 590' and reflecting the light with the polarizing direction parallel to the metal grid wires 590'.

Figure 14:
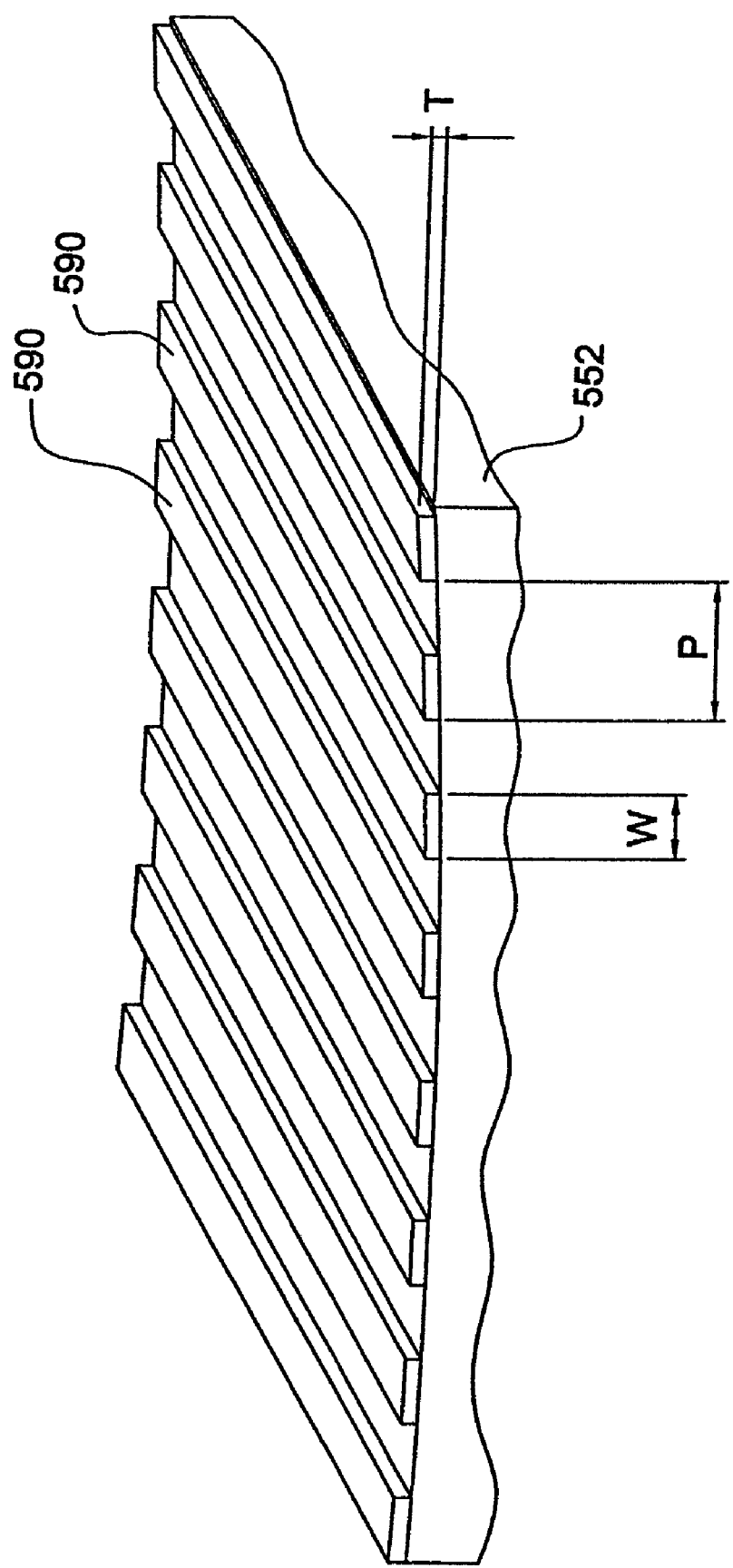
FIG. 14 is a partial enlarged perspective schematic view of metal grid wires of the lamp shown in FIG. 12.

Now referring to FIG. 14, it depicts metal grid wires 590 of the lamp 550 according to an embodiment of the present invention. According to the present invention, the metal grid wires 590 are made of aluminum, silver, copper or alloy, and preferably are made of aluminum. Preferably, the pitch P of the metal grid wires 590 is below about 300 nm, the thickness T of the metal grid wires 190 is in the range from about 30 nm to about 200 nm, and the ratio of the width W to the pitch P of the metal grid wires 590 is in the range from about 0.1 to about 0.8. The metal grid wires 590 according to the present invention and the reflective film 554 can be formed on the glass tube 552 by the same process at the same time. Alternatively, the metal grid wires 590 can be formed by the additional process. It will be apparent to those skilled in the art that the orientation of the metal grid wires 590 can be varied as desired.

Figure 15:
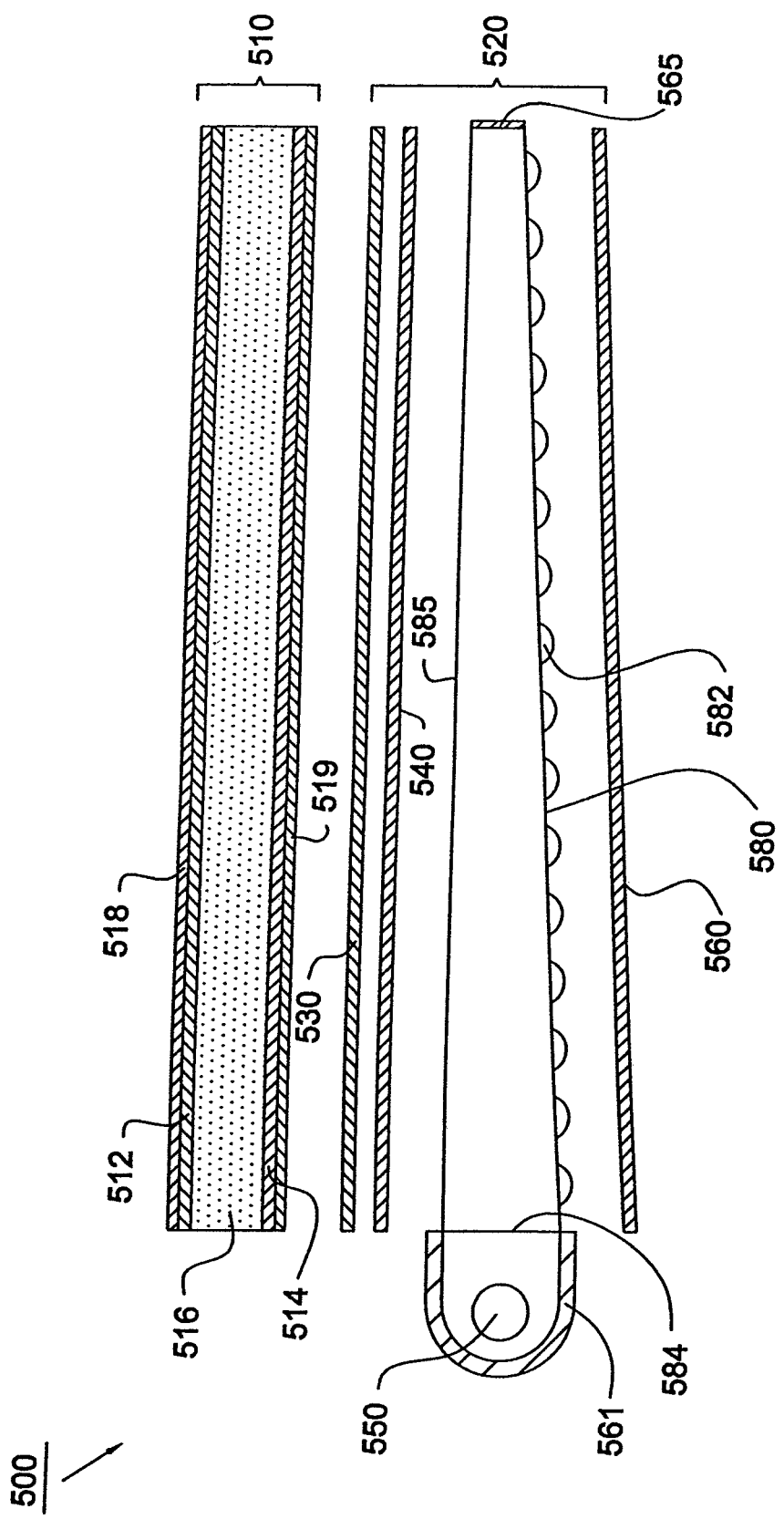
FIG. 15 is a cross sectional schematic view of a liquid crystal display using the lamp according to the present invention.

Referring to FIG. 15, it depicts a liquid crystal display 500 using the lamp 550 according to the present invention. The liquid crystal display 500 comprises a liquid crystal display panel 510 and a back light module 520. The liquid crystal display panel 510 comprises two transparent substrates 512, 514 and liquid crystal material 516 disposed therebetween. The outer surfaces of transparent substrates 512, 514 of the liquid crystal display panel 510 are covered with polarizing sheet 518, 519, and the inner surfaces thereof are provided with switching elements for changing the alignments of the molecular of the liquid crystal material 516 and thus generating images.

The back light module 520 is served as a panel light device for evenly illuminating the liquid crystal display panel 510. The back light module 520 comprises the above-mentioned lamp 550, a U-shaped reflector 561 surrounding the lamp 550, a wedge light guide 280 and a plurality of layers of optical films, such as diffusing sheet 540 and a prism sheet 530. The diffusing sheet 540 is used for further evenly diffusing the light. The prism sheet 530 is commercially available from 3M™ Company of St. Paul Minn. under the trade name Brightness Enhancement Film II (BEF II) for gathering the light in the direction perpendicular thereto.

The light emitted from the lamp 550 which has a polarized direction perpendicular to the longitudinal direction of the lamp 550 (perpendicular to the metal grid wires 590) is transmitted into an incoming surface 584 of the light guide 580. The light guide 580 is provided with scattering elements 582, such as a printed dot pattern or a V-shaped notched pattern on the bottom surface of the light guide 580, for scattering the light in the light guides 580 and transmitting the light out of the upper surface or the outgoing surface 585 of the light guide 580 so as to serve as a uniform panel light source and illuminate the liquid crystal display panel 510. The light guide 580 is typically made of PMMA by the process of press or ejection molding. The light guide 580 further comprises reflectors 560, 565 disposed in the bottom surface and the distal end of the light guide 280 for reflecting the light back to the light guide 580.

Furthermore, in the light guide 580, the polarizing light is scattered by the scattering elements 182 and transmitted into the liquid crystal display panel 510. The polarization of the light which is transmitted into the liquid crystal display panel 510 is substantially perpendicular to the metal grid wires 590. Therefore, the light absorbed by the polarizing sheet 519 of the liquid crystal display panel 510 is decreased so the light efficiency of the liquid crystal display 500 is increased.

It will be apparent to those skilled in the art that the polarizing direction of the polarizing sheet 519 on the liquid crystal display panel 510 is corresponding to that of the metal grid wires 590 such that the brightness of the liquid crystal display 500 is increased. Generally speaking, because of the arrangement of the liquid crystal display, the back light module 520 according to the present invention is particularly adapted to be used with a thin film transistor (TFT) liquid crystal display panel of In-Plane-Switching, Vertical Alignment, and Multi-Domain Vertical Alignment.

Figure 16:
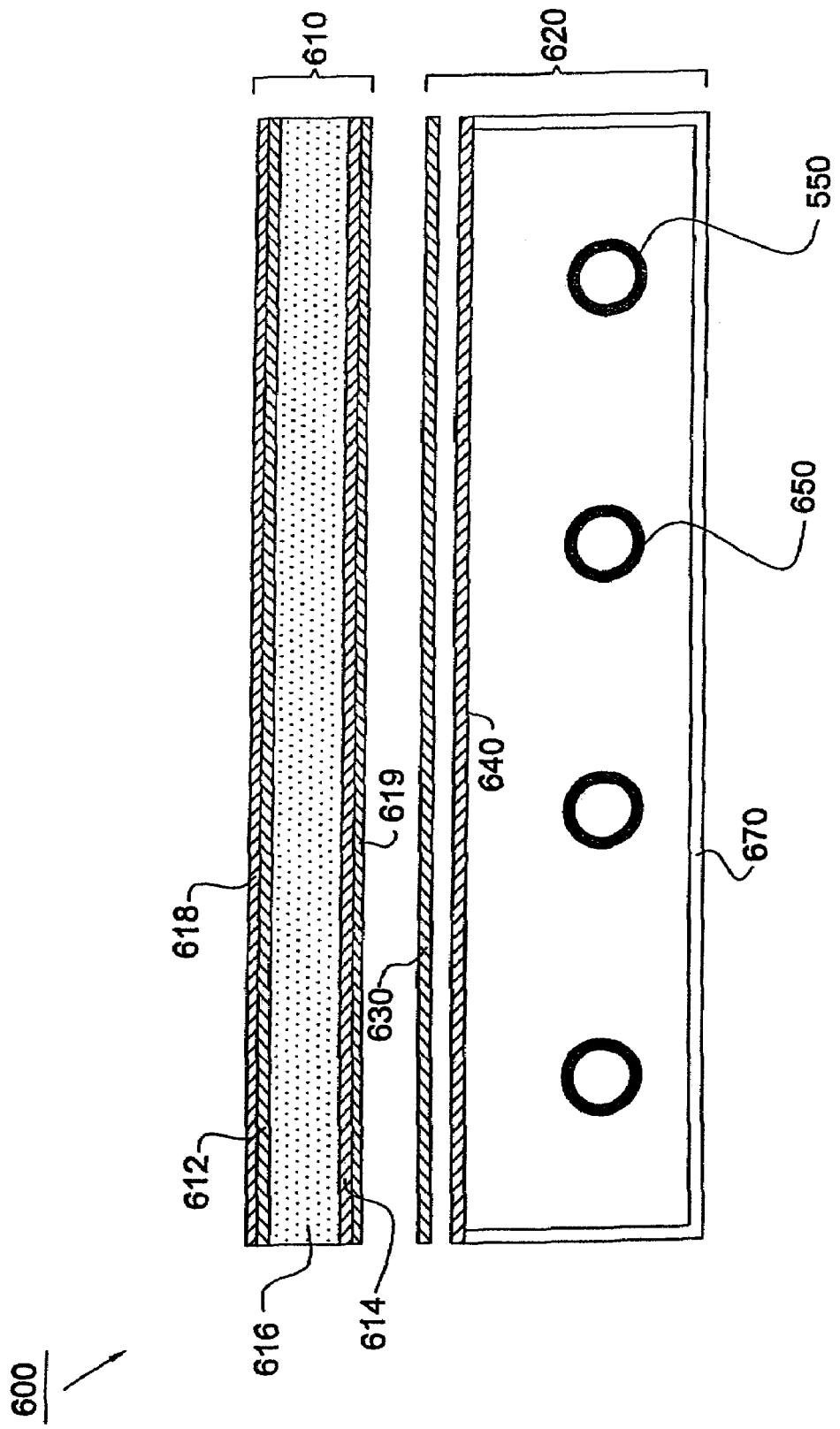
FIG. 16 is a cross sectional schematic view of another liquid crystal display using the lamp according to the present invention.

Now referring to FIG. 16, it depicts a liquid crystal display 600 using the lamp 550 according to the embodiment of the present invention. The liquid crystal display 600 is generally similar to the liquid crystal display 500, wherein the similar elements are designated with the similar reference numerals. The liquid crystal display 600 comprises a back light guide 620 of the direct type, which has a plurality of lamps 550 disposed in a housing 670. The polarized light emitted from the lamp 550 can be transmitted through the polarizing sheet 619 of the liquid crystal display panel 610 and into the liquid crystal display panel 610. The polarized light can be transmitted through the polarizing sheet 619 of the liquid crystal display panel 610 so that the light absorbed by the polarizing sheet 619 is decreased and thus the light efficiency of the liquid crystal display 600 is increased.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A back light module for illuminating a liquid crystal display panel of a liquid crystal display, comprising:
   a polarized light source device comprising:
      a light source for generating light;
      a reflector surrounding the light source for reflecting the light and having an opening for emitting the light;
      a transparent substrate disposed at the opening;

an antireflection layer disposed on the transparent substrate; and a plurality of metal grid wires disposed on the antireflection layer for transmitting the light with a predetermined polarization therethrough; and a light guide having at least one incoming surface facing the polarized light source, a plurality of scattering elements, and an outgoing surface, wherein the light emitted from the polarized light source is transmitted into the light guide from the incoming surface, scattered by the scattering elements, and then transmitted out of the light guide from the outgoing surface.

2. The back light module as claimed in claim 1, further comprising:

a plurality of optical films disposed between the outgoing surface of the light guide and the liquid crystal display panel.

3. The back light module as claimed in claim 2, wherein the optical films comprise:

at least one diffusing sheet for diffusing the light emitted from the light guide; and at least one prism sheet for gathering the light in the direction perpendicular thereto.

4. The back light module as claimed in claim 1, wherein the metal grid wires are made of aluminum.

5. The back light module as claimed in claim 1, wherein the metal grid wires are made of a material selected from the group consisting of aluminum, silver, copper and alloys and combinations thereof.

6. The back light module as claimed in claim 1, wherein the pitch of the metal grid wires is below about 300 nm.

7. The back light module as claimed in claim 1, wherein the metal grid wires have a thickness in the range from about 30 nm to about 200 nm.

8. The back light module as claimed in claim 1, wherein the ratio of the width to the pitch of the metal grid wires is in the range from about 0.1 to about 0.8.

9. The back light module as claimed in claim 1, wherein the ratio of the width to the pitch of the metal grid wires is in the range from about 0.5 to about 0.6.

10. The back light module as claimed in claim 1, wherein the antireflection layer is made of a material, the refractive index of which is above about 1.5.

11. The back light module as claimed in claim 1, wherein the antireflection layer is made of nitrogen silicide (Si-Nx).

12. The back light module as claimed in claim 1, wherein the antireflection layer is a multi-layer film.

13. The back light module as claimed in claim 1, wherein the refractive index of the antireflection layer is in the range between the refractive index of the transparent substrate and the equivalent refractive index of the metal grid wires.

14. The back light module as claimed in claim 1, wherein the refractive index $n_m$ of the antireflection layer is derived from the following equation:

$$n_m \approx \sqrt{(n_a \times n_s)}$$

where $n_s$ is the refractive index of the transparent substrate and $n_a$ is the equivalent refractive index of the metal grid wires.

15. The back light module as claimed in claim 1, wherein the thickness d of the antireflection layer is derived from the following equation:

$$d \approx \tfrac{1}{4} \times \lambda / n_m$$

where $n_m$ is the refractive index of the antireflection layer and $\lambda$ is the wavelength of the light emitted from the light source.

* * * * *